(12) United States Patent
Kudo

(10) Patent No.: US 8,038,227 B2
(45) Date of Patent: Oct. 18, 2011

(54) BRAKE CONTROL DEVICE IMPROVING DRIVER'S BRAKE FEELING

(75) Inventor: Keni Kudo, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 12/007,926

(22) Filed: Jan. 17, 2008

(65) Prior Publication Data

US 2008/0189020 A1 Aug. 7, 2008

Related U.S. Application Data

(62) Division of application No. 10/929,644, filed on Aug. 31, 2004, now abandoned.

(30) Foreign Application Priority Data

Sep. 11, 2003 (JP) .................................. 2003-319817

(51) Int. Cl.
*B60T 7/00* (2006.01)
*B60T 8/42* (2006.01)

(52) U.S. Cl. .................... 303/15; 303/155; 303/DIG. 1; 303/DIG. 2; 701/301

(58) Field of Classification Search .................. 303/3, 5, 303/11, 15, 155, 167, 113.1, 115.1, DIG. 1, 303/DIG. 2; 180/170; 701/93, 301
See application file for complete search history.

(56) References Cited

U.S. PATENT DOCUMENTS

| | | | |
|---|---|---|---|
| 5,189,619 A | 2/1993 | Adachi et al. .................... 701/96 |
| 5,278,764 A | 1/1994 | Iizuka et al. .................. 701/301 |
| 5,904,215 A | 5/1999 | Ikeda ............................. 180/169 |
| 6,164,735 A | 12/2000 | Aizawa et al. ................. 303/155 |
| 6,292,753 B1 | 9/2001 | Sugimoto et al. ............. 701/301 |
| 6,619,759 B2 | 9/2003 | Bradsen et al. .................... 303/7 |
| 6,742,850 B1 | 6/2004 | Eckert et al. .................. 303/144 |

FOREIGN PATENT DOCUMENTS

| | | |
|---|---|---|
| DE | 197 12 857 A1 | 10/1998 |
| DE | 197 12 858 A1 | 10/1998 |
| DE | 101 05 645 A1 | 12/2001 |
| DE | 101 24 593 A1 | 1/2002 |
| JP | A-8-198075 | 8/1996 |
| JP | A-10-59159 | 3/1998 |
| JP | 115528 A * | 1/1999 |

(Continued)

OTHER PUBLICATIONS

English translation of DE-19712857 A1 publication date: Oct. 1998.*

(Continued)

*Primary Examiner* — Melody Burch
(74) *Attorney, Agent, or Firm* — Posz Law Group, PLC

(57) ABSTRACT

An upper limit of a target value of a wheel cylinder pressure generated by a wheel cylinder is set. Specifically, the upper limit of the target value is predetermined and increases with elapsed time from the beginning of the control. Accordingly, the actual application pressure generated can be set to be equal to or less than the upper limit. Thus, it is possible to prevent the application pressure from being dramatically increased when the automatic brake control is switched to a manual brake control from automatic brake control. Accordingly, it is less likely that the driver will be caused to feel a sense of unease by a change from automatic to manual brake control.

2 Claims, 12 Drawing Sheets

FOREIGN PATENT DOCUMENTS

JP     A-2000-313322     11/2000

OTHER PUBLICATIONS

Office Action and its translation issued from German Patent Office dated Nov. 27, 2007 for Application No. 10 2004 043 048.9-21.

Office Action dated Aug. 19, 2008 in corresponding Japanese patent application No. 2003-319817 (and English translation).

Notice of the Reason of Refusal issued from the Japanese Patent Office mailed on May 12, 2009 in the corresponding Japanese patent application No. 2003-319817 (and English translation).

* cited by examiner

BRAKE CONTROL DEVICE IMPROVING DRIVER'S BRAKE FEELING

CROSS REFERENCE TO RELATED APPLICATION

This application is a divisional application of application Ser. No. 10/929,644 filed on Aug. 31, 2004, which is based upon and claims the benefit of Japanese Patent Application No. 2003-319817 filed on Sep. 11, 2003, the content of which are incorporated herein by reference.

FIELD OF THE INVENTION

The present invention relates to a vehicular brake control device that improves the brake feeling of a driver by adjusting deceleration generated by an automatic brake and a manual brake.

BACKGROUND OF THE INVENTION

Japanese Patent Publication No. 2000-313322 discloses a related vehicular brake control device that aims to achieve a good brake feeling when a manual brake is operated during automatic braking. The brake control device has a relief valve for releasing brake fluid, and is thus able to release brake fluid pressure applied to a wheel cylinder by the manual brake. When a brake pedal is operated during automatic braking, the opening of the relief valve is controlled in accordance with a release time. This release time is determined based on a vehicle body deceleration, and corrected using a depression speed of the brake pedal. Thus, a pedal stroke that corresponds with the manual braking state can be obtained.

However, according to the disclosure of Japanese Patent Publication No. 2000-313322, when the brake fluid pressure applied to the wheel cylinder is released by the operation of the manual brake, the deceleration speed generated by the automatic brake is temporarily reduced, and deceleration speed inconsistency, namely, a fall in the deceleration speed, may result.

For example, if there is a risk of a frontal collision with an obstacle in front of the vehicle, the likelihood that a collision will occur (hereinafter referred to as the "frontal collision likelihood level") during operation of the automatic brake increases, and thus the driver may operate the manual brake. At this time, the automatic brake is stopped, and brake fluid pressure is applied to the wheel cylinder based on a master cylinder pressure generated by the operation of the manual brake. Thus, when an operation amount of the manual brake by the driver is small, even if the corresponding brake fluid pressure is applied to the wheel cylinder, the brake fluid pressure applied is smaller than that previously generated by the automatic brake. Therefore, even if the driver actually operates the manual brake, the deceleration speed is reduced.

As a result of this reduction, the driver feels a sense of unease, i.e., feels that the braking force is weakened, and is not able to obtain a brake feeling that meets with the driver's expectations.

Moreover, when the above brake control device performs the brake assist control, if the frontal collision likelihood level increases during operation of the automatic brake, and the driver strongly depresses the brake pedal, the automatic brake is stopped, and the brake assist control is started. At this time, the amount of the pressure applied to the wheel cylinder is boosted in accordance with the driver's operation of the brake pedal, and high brake pressure is suddenly applied to the wheel cylinder.

In this case, the vehicle body deceleration is increased, and the driver may feel a sense of unease due to the sudden braking force. In particular, if the brake control device is configured such that (i) the frontal collision likelihood level is determined based on CCD camera detection or the like, and (ii) a control amount generated by the brake assist control is adjusted by a pre-crash control in accordance with the frontal collision likelihood level, the control amount is adjusted to a higher amount when the collision likelihood level is high. Thus, when the driver feels that there is a risk of collision, and depresses the brake pedal strongly, the pressure applied to the wheel cylinder may be increased rapidly.

SUMMARY OF THE INVENTION

A main object of the present invention is to provide a vehicular brake control device that can perform a brake control so as to generate a brake feeling that accords with a driver's expectations by adjusting a deceleration speed when an automatic brake is switched to a manual brake.

Another object of the present invention is to provide a brake control device that can inhibit sudden increase in a vehicle body deceleration, and inhibit the driver from being caused to feel a sense of unease when a braking force is applied suddenly.

According to a first aspect of the present invention, a lower limit of a target value of an application pressure generated by a braking force generating unit is set. The lower limit is determined based on a pressure generated by a wheel cylinder during automatic brake control. Accordingly, it is possible to make sure that the actual application pressure generated is equal to or more than the first value. Thus, it is possible to prevent the application pressure from being decreased unintentionally when the automatic brake control is switched to a brake assist control, and thus, it is possible to maintain a deceleration speed of a vehicle at the level of a vehicle body deceleration generated during the automatic brake control. Accordingly, it is less likely that the driver will be caused to feel a sense of unease by weakening of the braking force. Accordingly, the brake control can be performed such that a brake feeling is generated that accords with a driver's expectations.

The first value may be determined, for example, based on a relationship between a vehicle body deceleration generated by the application pressure generated by the braking force generating unit during the automatic brake control and an effective braking force. That is, the first value is based on application pressure generated by the braking force generating unit during automatic brake control that is executed before switching to manual brake control.

According to a second aspect of the present invention, when the automatic brake control is switched to the manual brake control, an upper limit value of the target value is set based on the application pressure generated by the braking force generating unit during the automatic brake control. Further, the braking force generating unit is caused to generate the application pressure to be equal to or less than the upper limit value.

In this configuration, the upper limit value for the application pressure generated by the braking force generating unit is set. Further, a value that is obtained by adding the first value to an upper limit value of the change in the application pressure is adopted as this upper limit value. Accordingly, it is possible to make sure that the actual application pressure generated does not increase suddenly.

With the above described configuration, it is possible to prevent the application pressure from being increased rapidly when the automatic brake control is switched to the manual brake control. Thus, it is less likely that the driver will be caused to feel a sense of unease resulting from sudden application of braking force. Accordingly, the brake control can be performed such that a brake feeling is generated that accords with the driver's expectations.

The upper limit value may be calculated, for example, by adding the first value to the upper limit value of the change in the application pressure of the braking force generating unit that is determined based on an elapsed time from the start of the manual control.

Thus, when the brake assist control for assisting the application pressure generated by the braking force generating unit in accordance with the driver's operation of a brake control member as the manual brake control is performed, for example, a frontal collision likelihood level indicating the likelihood of a collision with an obstacle in front of the vehicle may be detected by a collision likelihood level detection portion, and an assist pressure that corresponds with the collision likelihood level may be determined. The assist pressure may then be added to the brake fluid pressure applied to the master cylinder detected by pressure detection unit to determine a second value. The first value and the second value may then be compared with each other, and the larger one of these values may be compared with the upper limit value, and the smaller one of these values set as a target value.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
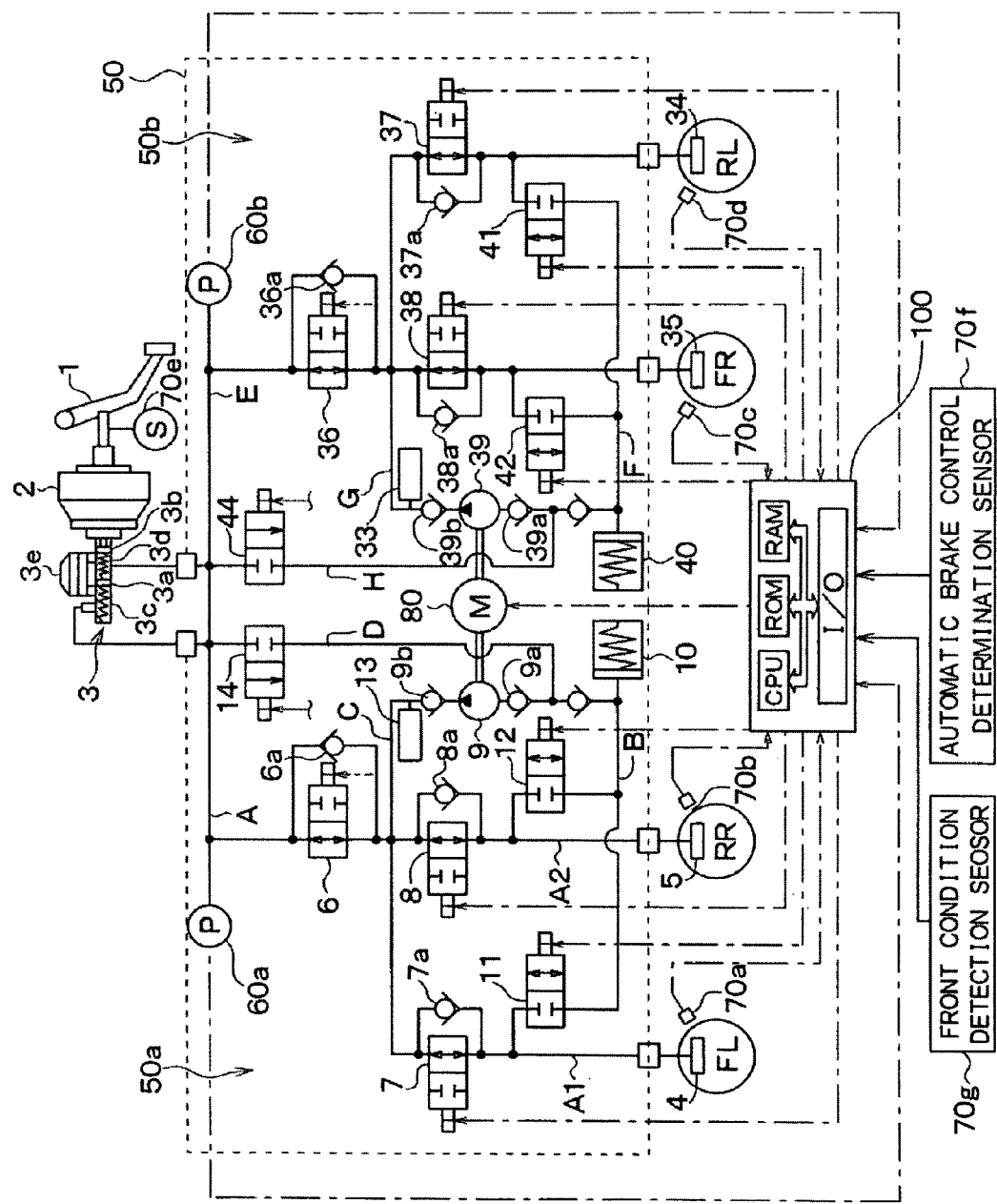
FIG. 1 shows a configuration of a brake system including a brake fluid pressure control device according to a first embodiment of the present invention.

The present invention will be described further with reference to various embodiments in the drawings.

First Embodiment

Next, a first embodiment of the present invention will be described with reference to drawings. FIG. 1 schematically shows a brake system including a brake fluid pressure control device. The basic structure of the brake system according to the first embodiment of the present invention will be described with reference to FIG. 1.

In the first embodiment of the present invention, the brake fluid pressure control device is mounted in a vehicle having two hydraulic piping systems (a diagonal split system), i.e., a first piping system 50a for controlling a brake fluid pressure applied to a front left wheel FL and a rear right wheel RR, and a second piping system 50b for controlling a brake fluid pressure applied to a right front wheel RF and a rear left wheel LR.

Referring to FIG. 1, when a brake pedal 1 that acts as a brake control unit is depressed by a driver, a braking force is applied to the vehicle. The brake pedal 1 is connected to a brake booster 2 that functions as a brake fluid pressure generation source, and a master cylinder 3. When the driver depresses the brake pedal 1, the pedal pressure is boosted, and master pistons 3a and 3b provided in the master cylinder 3 are pressed. Thus, a master cylinder pressure (hereinafter referred to as the "M/C pressure") is generated. The M/C pressure is applied equally to a primary chamber 3c and a secondary chamber 3d that are formed as separate chambers partitioned by the master pistons 3a and 3b.

The master cylinder 3 includes a master reservoir 3e having passages connected to the primary chamber 3a and the secondary chamber 3b, respectively. Brake fluid is supplied to the master cylinder 3 through the passages of the master reservoir 3e. Further, the master reservoir 3e stores excess brake fluid from the master cylinder 3. Note that, each of the passages connecting the master cylinder 3 and the primary chamber 3a and the secondary chamber 3b has a diameter that is very small in comparison with a pipe diameter of main pipes extending from the primary chamber 3a and the secondary chamber 3b, respectively. Therefore, when brake fluid flows into the master reservoir 3e from the primary chamber 3a and the secondary chamber 3b of the master cylinder 3, these passages function as orifices.

The M/C pressure generated in the master cylinder 3 is transmitted to each of wheel cylinders 4, 5, 34 and 35 through a brake control actuator 50. These wheel cylinders 4, 5, 34 and 35 effectively act as a braking force generating unit. The brake control actuator 50 has a brake piping system including a first piping system 50a and second piping system 50b. The M/C pressure is transmitted to the wheel cylinders 4, 5, 34, through the first and second piping systems 50a, 50b.

The structure of the brake control actuator 50 will be described below. Note that, the first piping system 50a and the second piping system 50b have substantially the same structure. Therefore, a description will only be given for the first piping system 50a, while that for the second piping system 50b will be omitted. The first piping system 50a includes a pipe A as a main pipe for transmitting the M/C pressure to each of the wheel braking force generating unit, i.e., the first wheel cylinder 4 provided at the front left wheel FL and the second wheel cylinder 5 provided at a rear right wheel RR.

The wheel cylinder pressure (hereinafter referred to as the "W/C pressure") is transmitted to each of the wheel cylinders 4 and 5 through the pipe A.

A first differential pressure control valve 6 is provided in the pipe A. The first differential pressure control valve 6 is a solenoid valve that can be controllably switched between two positions, i.e., an open position and a differential pressure-state position. During normal braking, the first differential control valve 6 is in the open position. However, when electric power is applied to the solenoid coil, the valve position is switched to the differential pressure-state position. When the differential pressure control valve 6 is in the differential pressure-state position, flow of brake fluid from the wheel cylinders 4 and 5 to the master cylinder 3 is only permitted when the brake fluid pressure of the wheel cylinders 4 and 5 reaches a pressure which is higher by a predetermined amount than the M/C pressure. Thus, the pipes are protected since the brake fluid pressure is constantly regulated such that the brake fluid pressure of the wheel cylinders 4 and 5 does not exceed a pressure that is higher than the brake fluid pressure at the master cylinder 3 by the predetermined pressure.

The pipe A is bifurcated into two pipes A1 and A2 on the downstream side of the first differential pressure control valve 6 toward the wheel cylinders 4 and 5. A first pressure increase control valve 7 is provided in the pipe A1, and a second pressure increase control valve 8 is provided in the pipe A2. The first pressure increase control valve 7 controls increase in the brake fluid pressure supplied to the first wheel cylinder 4. The second pressure increase control valve 8 controls increase in the brake fluid pressure supplied to the second wheel cylinder 5.

Each of the first and second pressure increase control valves 7 and 8 is a solenoid valve that can be controllably switched between two positions, i.e., an open position and a closed position. When the first and second pressure increase control valves 7 and 8 are placed in the open position, (i) the M/C pressure or (ii) a brake fluid pressure generated by discharging brake fluid from a front wheel pump (pump unit) 9, described later, can be applied to the first and second wheel cylinders 4 and 5.

Note that, during normal braking, where the brake pedal 1 is operated by the driver, the first differential pressure control valve 6, and the first and second pressure increase control valves 7 and 8 are constantly controlled so as to be placed in the open state. Further, safety valves 6a, 7a and 8a are respectively provided in parallel with the first differential pressure control valve 6, the first pressure increase control valve 7, and the second pressure increase control valve 8. The safety valve 6a of the first differential pressure control valve 6 allows the M/C pressure to be supplied to the wheels cylinders 4 and 5 if the brake pedal 1 is depressed by the driver when the first differential pressure control valve 6 is in the differential pressure-state position. Further, the safety valves 7a and 8a of the pressure increase control valves 7 and 8 allow the W/C pressure of the front left wheel FL and the rear right wheel RR to be reduced, in particular, if the brake pedal 1 is released by the driver during ABS control when the pressure increase control valves 7 and 8 are controlled so as to be placed in the closed position. Note that, the W/C pressure of the front left wheel FL and the rear right wheel RR is reduced in correspondence with the release of the brake pedal 1.

A pipe B connects between (i) respective points of the pipe A between the first and second pressure increase control valves 7 and 8 and the wheel cylinders 4 and 5, and (ii) a reservoir opening of an ABS control reservoir 10. A first pressure reduction control valve 11 and a second pressure reduction control valve 12 are provided in respective sections of the pipe B. Each of the first and second pressure reduction valves 11 and 12 is a solenoid valve that can be controllably switched between two positions, i.e., an open position and a closed position. During normal braking, the first and second pressure reduction control valves 11 and 12 are constantly controlled so as to be placed in the closed position.

A pipe C connects the ABS control reservoir 10 and the pipe A which is the main pipe. A pump 9 is provided in the pipe C. The pump 9 is a self-priming pump that is driven by a motor 80 such that brake fluid is pumped from the ABS control reservoir 10 toward the master cylinder 3 or the wheel cylinders 4 and 5. Safety valves 9a and 9b are provided for the pump 9 so that the pump 9 can pump the brake fluid in one direction. Further, a fixed capacity damper 13 is provided at the discharge side of the pump 9 in the pipe C for damping pulsation of the brake fluid pumped from the pump 9.

A pipe D is connected to the pipe C at a point between the ABS control reservoir 10 and the pump 9. The pipe D is connected to the primary chamber 3a of the master cylinder 3. A first control valve 14 that can be controllably switched between an open position and a closed position is provided in the pipe D.

Brake fluid is pumped by the pump 9 from the master cylinder 3 to the pipe A via the pipe D. Thus, the configuration makes it possible to increase the respective W/C pressures of the wheel cylinders 4 and 5 by supplying brake fluid thereto when a brake assist control, a traction control system (TCS) control, an anti-brake system (ABS) control, or a side slip prevention control is performed.

A pressure sensor 60a is provided in the pipe A near to the master cylinder 3. The pressure sensor 60a substantially detects the M/C pressure.

The second piping system 50b has substantially the same structure as the first piping system 50a and is configured from the following structural members, namely, (1) a second differential pressure control valve 36 corresponds to the first differential pressure control valve 6; (2) third and fourth pressure increase control valves 37 and 38 respectively correspond to the first and second pressure increase control valves 7 and 8; (3) third and fourth pressure reduction valves 41 and 42 correspond to the first and second pressure reduction valves 11 and 12; (4) a pump 39 corresponds to the pump 9; (5) a reservoir 40 corresponds to the reservoir 10; and (6) pipes E, F, G and H respectively correspond to the pipes A, B, C and D.

Wheel speed sensors 70a to 70d for detecting rotational speed of the respective wheels FL to FR are provided in the brake system. Further, a pedal operation amount sensor 70e for detecting an operation amount of the brake pedal 1 is also provided in the brake system. This operation amount is a pedal depression force, a pedal stroke, or the like.

Furthermore, the brake system also includes an automatic brake control determination sensor 70f for detecting whether the automatic brake control is ON or OFF, i.e., for detecting whether the driver has turned on a switch that enables performance of the automatic brake control. Moreover, a front condition detection sensor 70g such as a CCD camera or a laser radar for detecting the front conditions of the vehicle (for example, the distance between the vehicle and another vehicle in front the vehicle) is provided in the brake system.

Respective detection signals from the wheel speed sensors 70a to 70d, the pedal operation amount sensor 70e, the automatic brake control decision sensor 70f, the front condition detection sensor 70g, and respective detection signals from the pressure sensors 60a and 60b are transmitted to the brake fluid pressure control device 100.

The brake fluid pressure control device 100 performs the brake fluid pressure control of the brake system, and includes a CPU, a ROM, a RAM, and an input/output (I/O) unit. Based on the detection signals, the brake fluid pressure control device 100 outputs control signals for controlling the motor 80 so as to drive the two-position valves 6 to 8, 11, 12, 14, 36 to 38, 41, 42 and 44, and the pumps 9 and 39, and control the W/C pressures.

Next, a brake control processing performed by the brake fluid pressure control device 100 will be described with reference to the flow charts shown in FIGS. 2 to 5.

Figure 2:
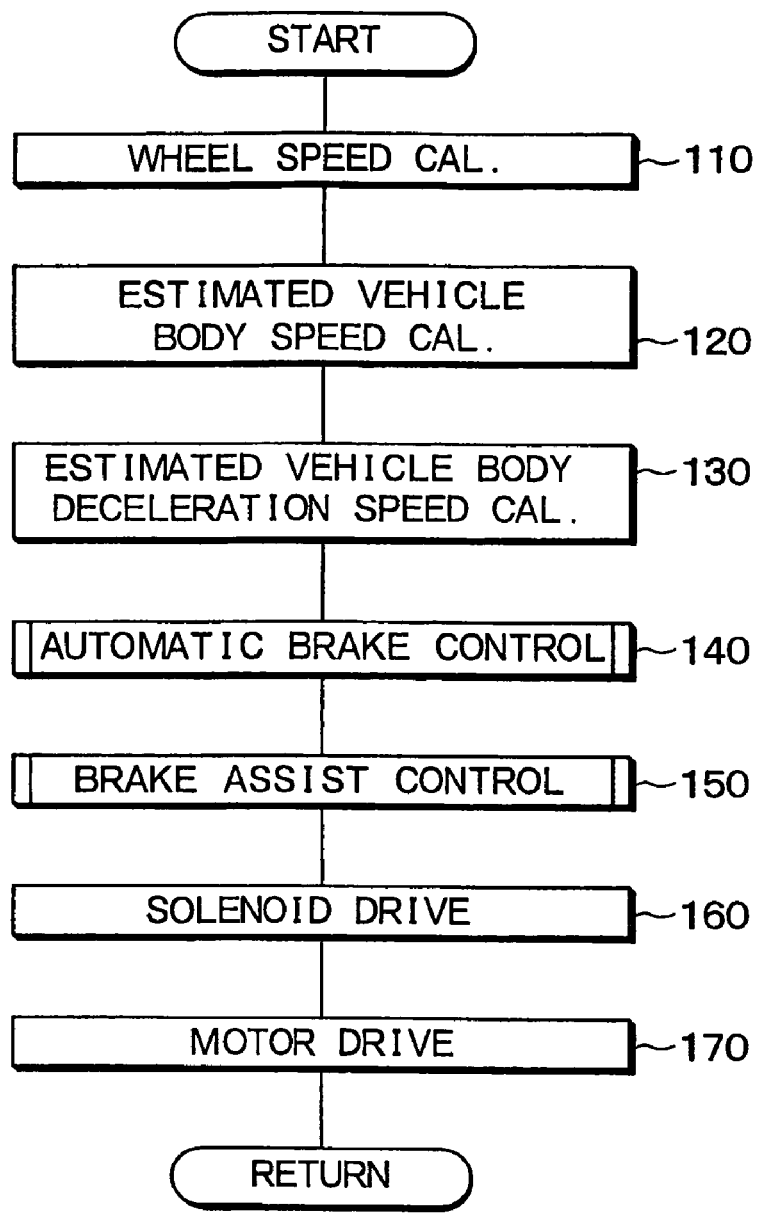
FIG. 2 is a flow chart showing a main routine of a brake control processing performed by the brake fluid pressure control device in FIG. 1.

FIG. 2 shows a main routine of the brake control processing. The processing shown in the flow chart is performed for each of a predetermined control cycle.

First, at 110, wheel speeds of the respective wheels FL, FR, RR and RL are calculated based on the signals from the vehicle speed sensors 70a to 70d. At 120, an estimated vehicle body speed is calculated based on the wheel speeds. The calculation of the vehicle body speed is performed using a conventional method. At 130, the change per unit time in the estimated vehicle body speed calculated at 120 is determined to enable calculation of an estimated vehicle body deceleration speed.

Figure 3:
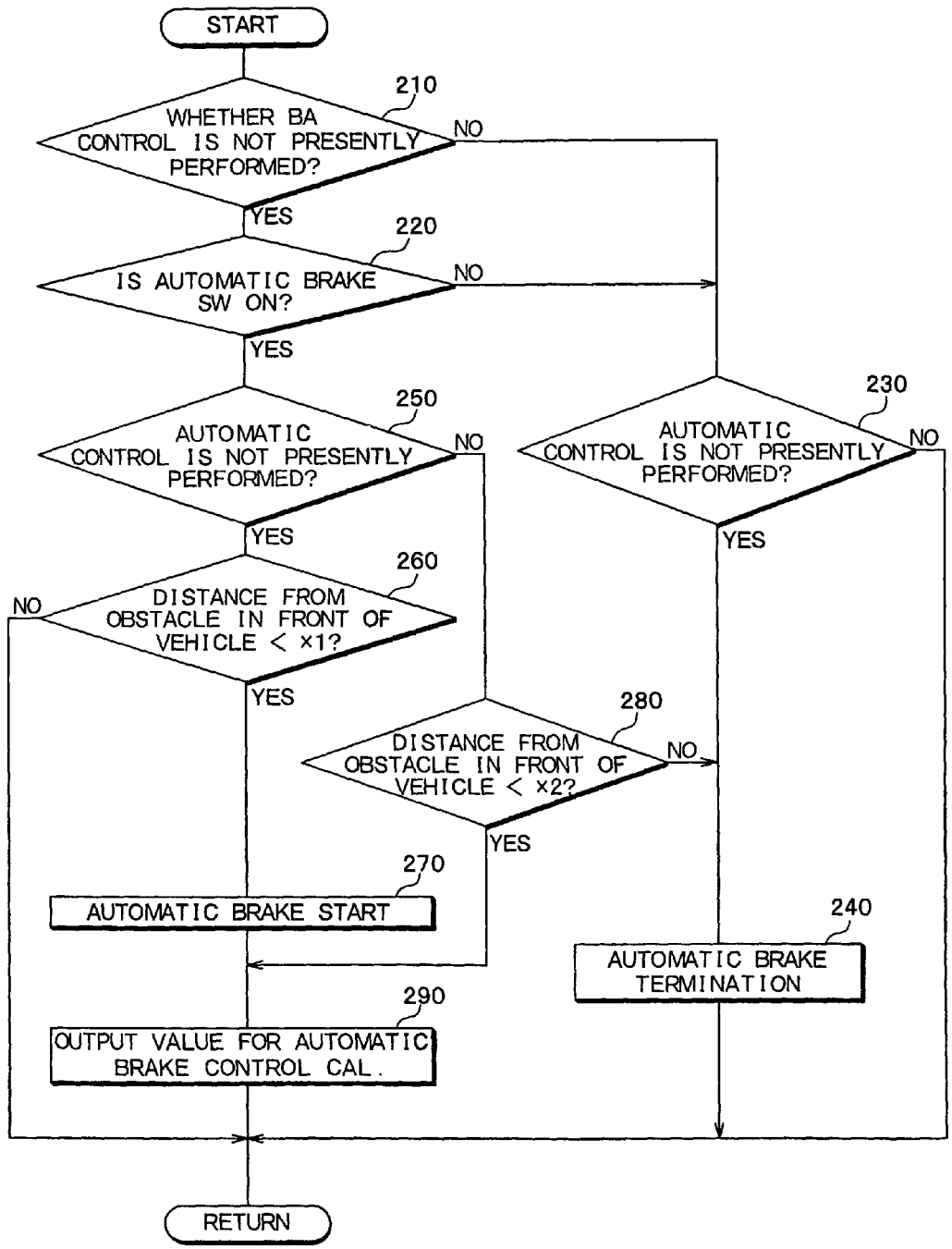
FIG. 3 is a flow chart showing an automatic brake control processing that is performed in the brake control processing of FIG. 2.

Then, at 140, an automatic brake control processing is performed. Brake control output values that are required for the automatic brake control are determined in the automatic brake control processing. FIG. 3 shows a flow chart of the automatic brake control processing. The processing will be described later in detail.

Figure 4:
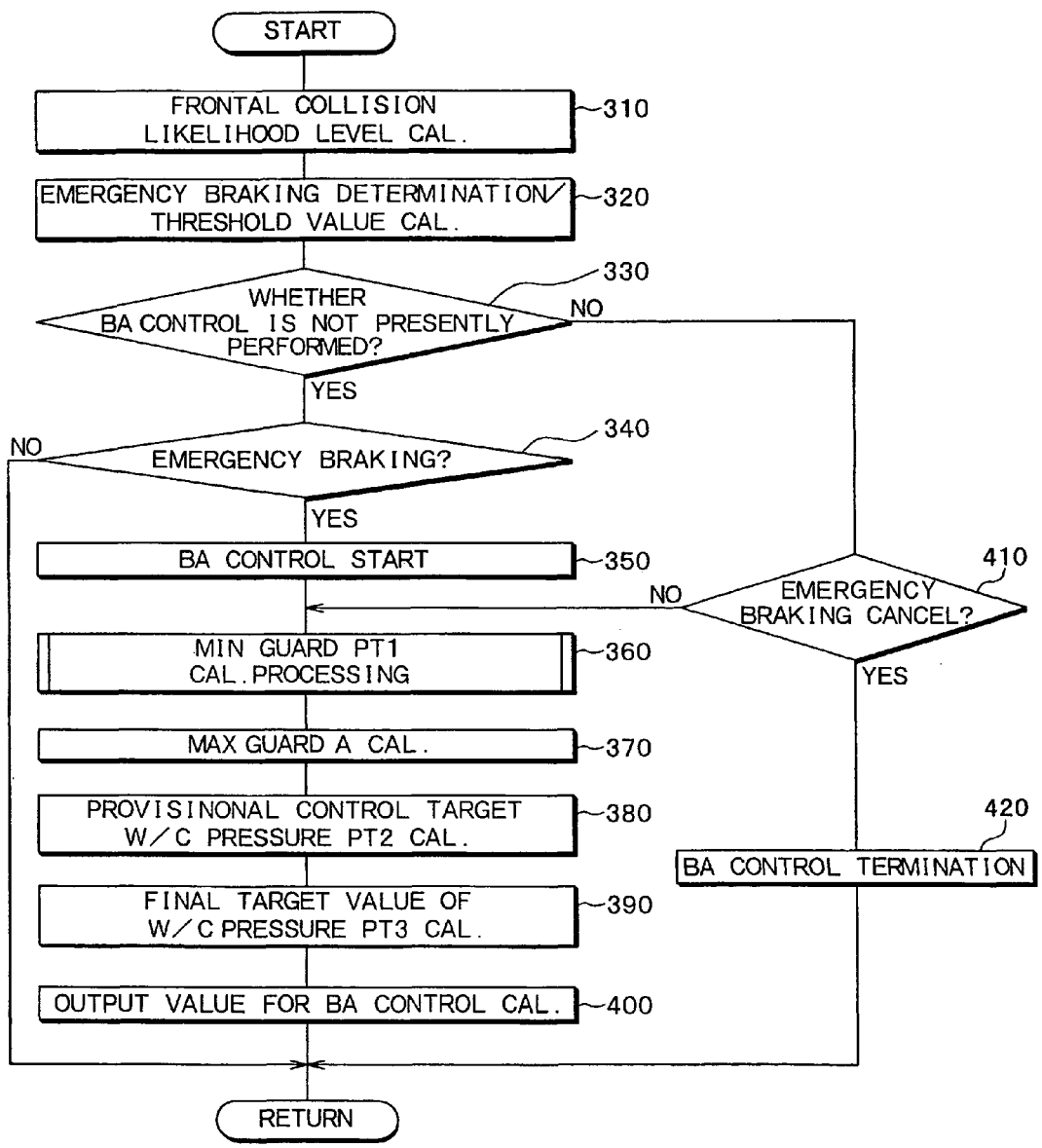
FIG. 4 is a flowchart showing a brake assist control processing in FIG. 2.
Figure 5:
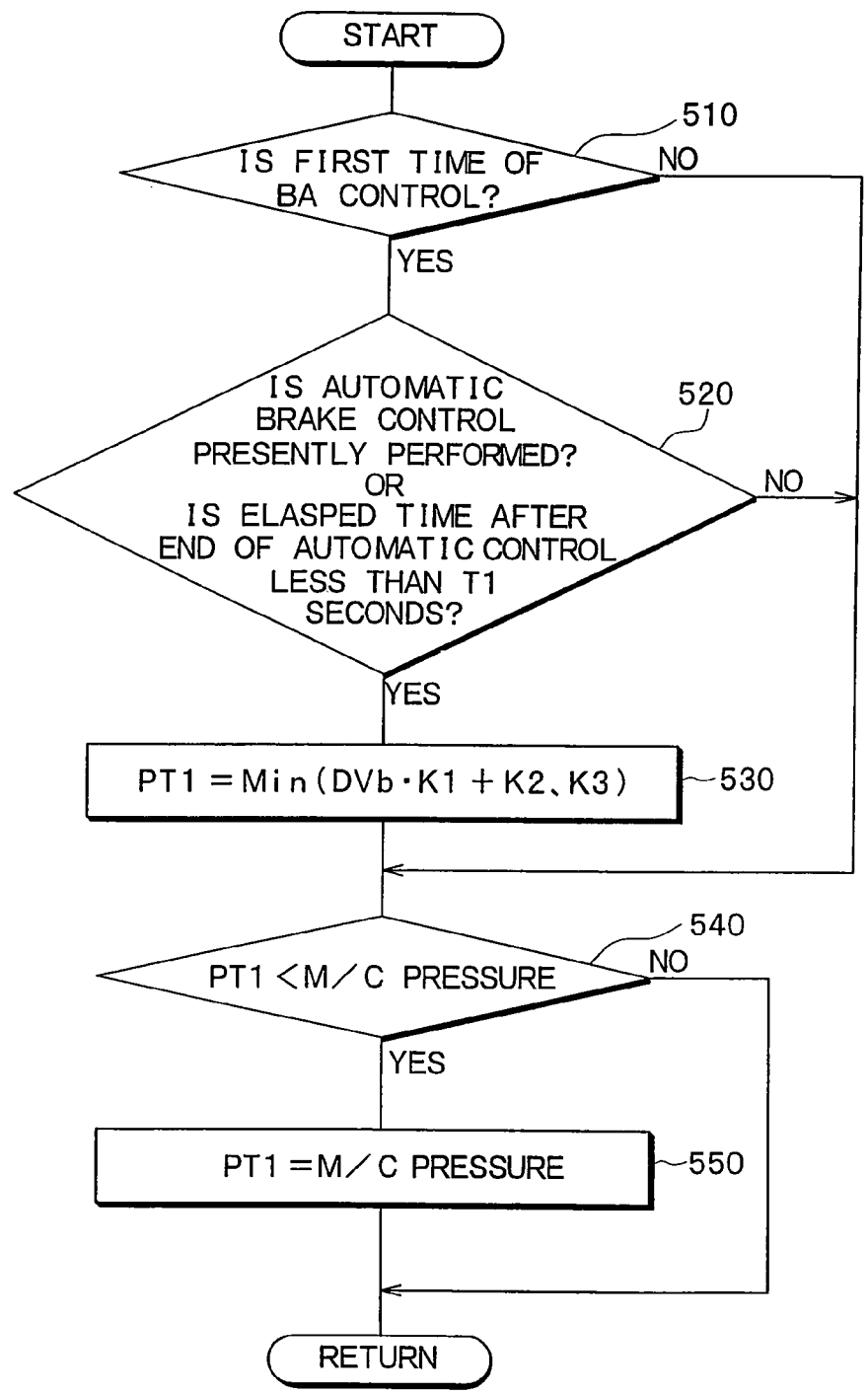
FIG. 5 is a flow chart showing a Min guard PT1 calculation processing in FIG. 4.

At 150, a pre-crash brake assist control processing (hereinafter simply referred to as the "brake assist control") is performed. Brake control output values required for the brake assist control are determined in the brake assist control processing. FIG. 4 shows a flow chart of the brake assist control processing. The processing will also be described later in detail.

At 160, signals are output for energizing the solenoids of the control valves in correspondence with the brake control output values determined in the automatic brake control processing or the brake assist control processing.

At 170, a signal is output for driving the motor 80 in correspondence with the brake control output values determined in the automatic brake control processing or the brake assist control processing.

When the solenoids are energized and the motor 80 driven, W/C pressure of each of the wheel cylinders 4, 5, 34 and 35 of the wheels FL to RR is generated so as to apply the desired braking force to each of the wheels FL to RR.

Next, the automatic brake control will be described in detail with reference to the flow chart of the automatic brake control processing shown in FIG. 3.

When the routine proceeds to the processing at 140 in FIG. 2, the automatic brake control processing shown in the flow chart of FIG. 3 is performed. At 210, it is determined whether the brake assist control is presently being performed or not. If the brake assist control has started, the brake assist processing is prioritized and performed before the automatic brake control. Thus, if the brake assist control is not presently being performed, the routine proceeds to the processing at 220. If the brake assist control is presently being performed, the routine proceeds to the processing at 230.

At 220, it is determined whether the switch for performing the automatic brake control is ON based on the detection signal from the automatic brake control determination sensor 70f. If the switch for performing the automatic brake control is not ON, it is not necessary to perform the automatic brake control. Thus, the routine proceeds to the processing at 230.

At 230, it is determined whether the automatic brake control is presently being performed. Namely, if (i) the automatic brake control was being performed at the previous control timing but the brake assist control has been started by the present control timing, or if (ii) the switch for performing the automatic brake control is turned off, it is determined that the automatic brake control is not presently being performed. If the determination is YES (if it is determined that the automatic brake control is not presently being performed) at 230, the routine proceeds, and the processing at 240 is performed. This processing terminates the automatic brake control and resets an automatic brake control in-progress flag in the brake pressure control device 100 so as to indicate that such termination has been performed. If the determination is NO (if it is determined that the automatic brake control is presently being performed) at 230, it is determined that the automatic brake control in-progress flag has already been reset. Thus, the automatic brake control processing is terminated directly.

If it is determined that the switch for performing the automatic brake control is ON at 220, performance of the automatic brake control is required, and the routine proceeds to the processing at 250. At 250, it is determined whether the automatic brake control is presently being performed or not, i.e., whether the control in-progress flag for the automatic brake control has been reset at 240. The conditions for starting and terminating the automatic brake control are different depending on whether the automatic brake control is presently being performed. Thus, a processing is performed that defines and sets these conditions.

Accordingly, if the determination is YES (if it is determined that the automatic brake control is not presently being performed) at 250, the routine proceeds to the processing at 260, where the starting condition for the automatic brake control is satisfied. More specifically, for example, it is determined whether the distance between the vehicle and an obstacle such as another vehicle in front of the vehicle is smaller than a predetermined threshold value X1. If the determination result at 260 is YES, the routine proceeds to the processing at 270. At 270, the automatic brake control in-progress flag is set in order to start the automatic brake control. Then, the routine proceeds to the processing at 290. If the distance between the vehicle and the obstacle in front of the vehicle is larger than the predetermined threshold value X1, it is not necessary to start the automatic brake control. Thus, the automatic brake control processing is directly terminated.

If the determination result is NO (if it is determined that the automatic brake is presently being performed) at 250, the routine proceeds to the processing at 280, where it is determined if the termination condition for the automatic brake control is satisfied. More specifically, for example, it is determined whether the distance between the vehicle and the obstacle in front of the vehicle is smaller than a predetermined threshold value X2. The threshold value X2 is larger than the threshold value X1. Accordingly, the starting condition and the termination condition for the automatic brake control are deliberately set so that there is a time gap between start and termination.

If the determination result is YES at 280, it is determined that the termination condition for the automatic brake control has not yet been satisfied, and the routine proceeds to the processing at 290. If the determination result is NO at 280, it is determined that the distance between the vehicle and the obstacle in front of the vehicle is sufficient. Accordingly, the termination condition for the automatic brake control is satisfied, so the routine proceeds to the processing at 240 where the automatic brake control is terminated.

At 290, the output values required for the automatic brake control are calculated. Namely, the processing obtains (i) the required braking forces for the respective wheels FL to RR, and (ii) the required time for energizing the solenoids of the control valves corresponding to the wheels FL to RR, and the required time for driving the motor 80 in order to realize the required braking forces.

Next, the brake assist control will be described in detail with reference to the flow chart of the brake assist control processing shown in FIG. 4.

When the routine proceeds to the processing at 150 in FIG. 2, the brake assist control shown in the flow chart of FIG. 4 is performed. At 310, a frontal collision likelihood level is calculated based on the detection signal from the front condition detection sensor 70g. The term frontal collision likelihood level as used in this specification refers to the likelihood that a collision with a vehicle that is in front of the driver's vehicle will occur. This frontal collision likelihood level is determined, for example, by a conventional method that is based on the distance between the driver's vehicle and the vehicle in front, the speed of the target object and the driver's vehicle speed.

At 320, an emergency braking determination and threshold value calculation are performed. More specifically, threshold values that acts as starting and termination conditions for starting and ending the brake assist control are determined. Generally speaking, these threshold values decrease as the frontal collision likelihood level rises. Since the threshold values are determined by a conventional method, a detailed description will be omitted here.

Next, at 330, it is determined whether the brake assist control is presently being performed or not. Specifically, it is determined whether a brake assist control flag, described later, has been reset. The brake assist control flag is in the brake fluid pressure control device 100. If the determination is YES (if it is determined that the brake assist control is not presently being performed) at 330, the routine proceeds to the processing at 340 where it is determined if it is necessary to carry out the brake assist control. If the determination is NO (if it is determined that the brake assist control is presently being performed) at 330, the routine proceeds to the processing at 410.

At 340, it is determined whether emergency braking is necessary. Namely, it is determined whether the detected value exceeds the threshold value for the emergency braking determined at 320 as the starting condition for the emergency braking.

If the determination result is YES at 340, the routine proceeds to the processing at 350. At 350, the brake assist control flag in the brake fluid pressure control device 100 is set so as to start the brake assist control. If the determination is NO at 340, it is not necessary to perform the brake assist control. Thus, the brake assist control processing is finished.

If the routine proceeds to the processing at 360, a Min guard PT1 calculation processing is performed. The processing is shown in detail in the flow chart of FIG. 5. The processing defines respective lower limit values of the W/C pressures generated in the respective wheel cylinders 4, 5, 34 and 35 of the wheels FL to RR.

At 510, it is determined whether the brake assist control processing is presently being performed for the first time. Specifically, it is determined whether the brake assist control flag was set during the present control period in the processing at 360 in FIG. 4. If the first cycle of the flow chart of the brake assist control processing has not yet been finished following setting of the brake assist control flag, it is determined that the brake assist control is presently being performed for the first time.

If the determination result is YES at 510, the routine proceeds to the processing at 520 where it is determined if the automatic braking control is presently being performed, or if less than T1 seconds has passed since the end of the automatic brake control. Basically speaking, the automatic brake control finishes when the brake assist control starts. However, in the case that the brake assist control starts during a cycle of the automatic brake control, the automatic brake control continues for that cycle. Thus, at such times, the lower limit value of the W/C pressure is not set. Thus, at 520, it is determined whether the automatic brake control is presently being performed.

After the end of the automatic brake control, the W/C pressure and the M/C pressure remain different for a certain period of time. For this reason, it is also determined whether less than T1 seconds has passed since the end of the automatic brake control.

If the determination result is YES at 520, the routine proceeds to the processing at 530 a first value PT1 is defined and set to the lower limit value of the W/C pressure. The first value PT1 is calculated based on the following equation:

$$PT1 = \text{Min}(DVd \cdot K1 + K2, K3) \qquad \text{Equation 1}$$

Figure 6:
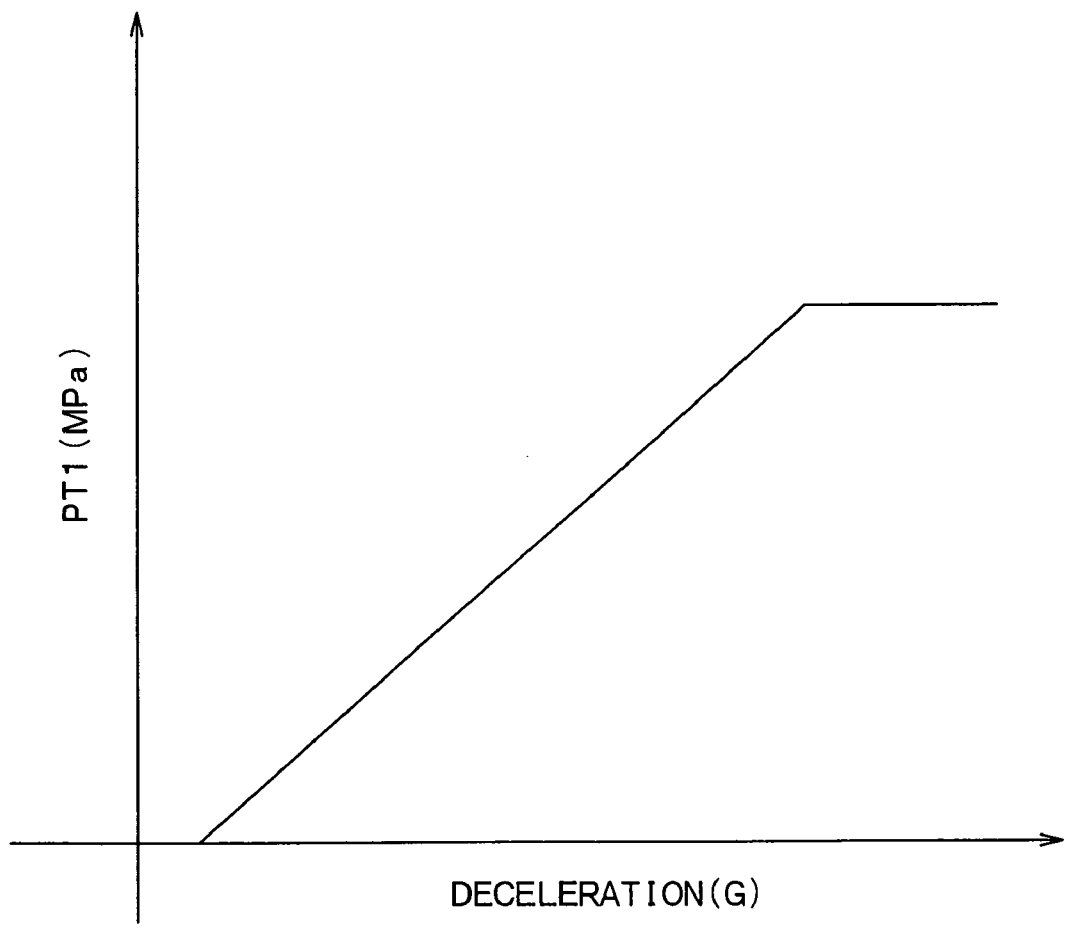
FIG. 6 is a graph showing a correlation between a vehicle body deceleration DVb and a wheel cylinder (W/C) pressure.

There is a correlation between a vehicle body deceleration DVd and the W/C pressure as shown, for example, in FIG. 6. Thus, the W/C pressure can be estimated based on the vehicle body deceleration DVd determined in the present calculation cycle, i.e., the W/C pressure is estimated as a function of the present vehicle body deceleration DVb based on the vehicle body deceleration DVd and the effective braking force. Specifically, the W/C pressure is determined using the linear expression shown in Equation 1. Then, the routine proceeds to the processing at 540.

In Equation 1, K1 and K2 are coefficients of a linear function of a relationship (see FIG. 6) between the vehicle body deceleration and the effective braking force. This relationship can be determined, for example, experimentally. In a normal vehicle, there is a range where the vehicle body is decelerated by engine braking, for example, even if the driver does not depress the brake pedal 1 and the W/C pressures are 0 atmospheres (atm). Therefore, the coefficient K2 is set to a negative value such that the first value PT1 that is taken as an estimated value of the W/C is equal to the M/C pressure (0 atm when the brake pedal 1 is not depressed) when the vehicle body deceleration in FIG. 6 is zero or close thereto.

On the other hand, the coefficient K3 corresponds to a MAX guard of the first value PT1. During normal driving, the case where the vehicle body deceleration DVb is equal or more than a maximum deceleration is not taken into consideration. Therefore, even if the vehicle body deceleration DVb reaches or exceeds the maximum deceleration of the vehicle, the first value PT1 does not exceed the value of the coefficient K3 that corresponds to the W/C pressure required for reaching the maximum speed of the vehicle. Specifically, the maximum speed of the vehicle is capable of is determined based on factors such as the road surface and the frictional coefficient of tires. The W/C pressure required for reaching this maximum speed in the case that the vehicle is driving on a road surface with high μ is obtained experimentally. Then, a value corresponding to the determined W/C pressure is set to the coefficient K3.

If the determination result at 510 or at 520 is NO, the routine proceeds to the processing at 540. At this time, the PT1 value determined in the previous Min guard PT1 calculation processing (hereinafter referred to as the "previously determined first value PT1") is retained.

At 540, it is determined whether the first value PT1 determined at 530 or the previously determined first value PT1 is smaller than the M/C pressure. During the brake assist control, a W/C pressure that is basically larger than the M/C pressure is generated. It is therefore undesirable if the target value of the W/C pressure is lower than the target value of the M/C pressure. Thus, if the determination result is YES at 540, the routine proceeds to the processing at 550. At 550, the first value PT1 is changed to a value equal to the M/C pressure, and the Min guard PT1 calculation processing is finished. If the determination result is NO at 540, the first value PT1 determined at 530 or the previously determined first value PT1 is larger than the M/C pressure. Therefore, these values are retained, and the Min guard PT1 calculation processing is finished.

Figure 7:
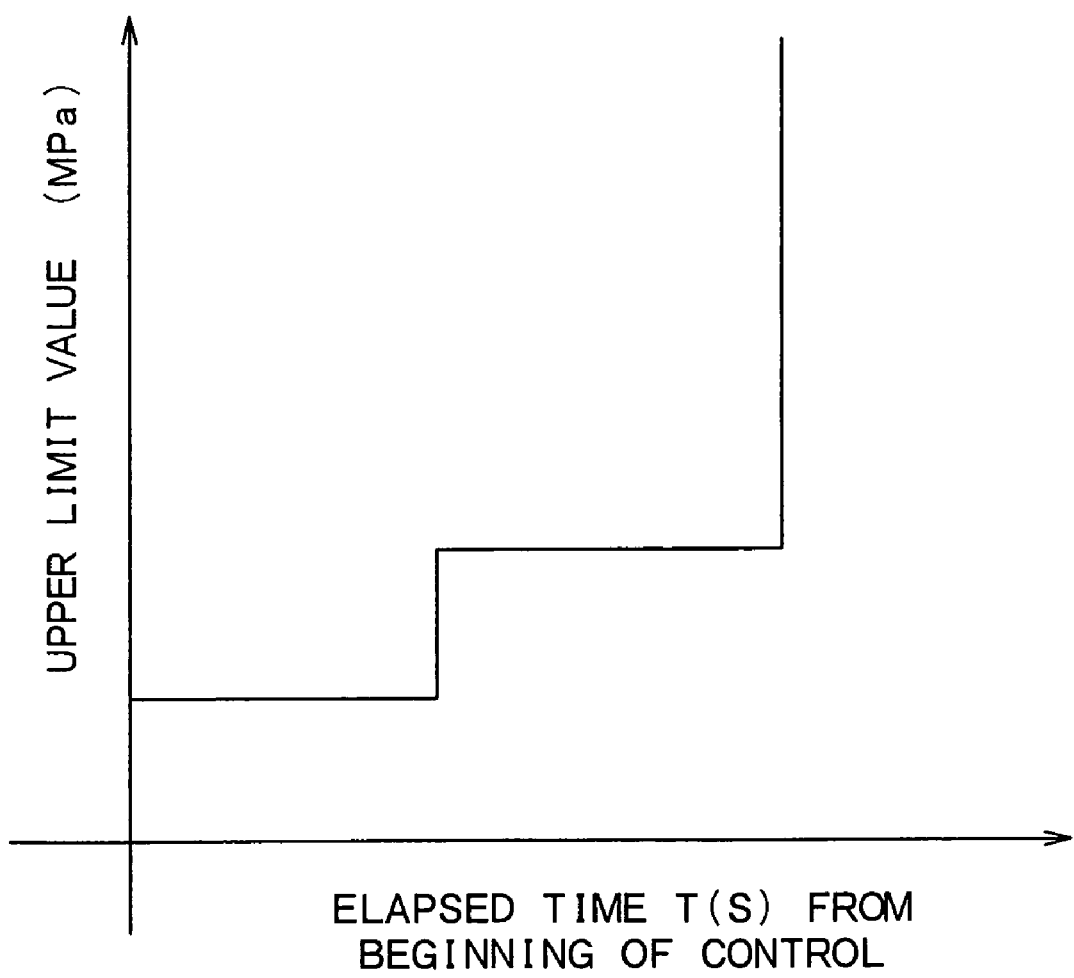
FIG. 7 is a graph showing a correlation between a post-start elapsed time T (s) and an upper limit value A (MPa)

As described above, when the first value PT1 as the lower limit value of the W/C pressure is set, the routine proceeds to the processing at 370 in FIG. 4, where a MAX guard A calculation processing is performed. This processing may be performed, for example, based on a map showing a correlation between the elapsed time T (s) since control started and the upper limit value A (Mpa) in FIG. 7. The term upper limit value A as used in this specification means the critical value of the W/C pressure that is set to restrict deceleration generated in correspondence with the W/C pressure.

When the automatic brake control is switched to the brake assist control, it is not desirable if excessively rapid deceleration takes place since the driver may be caused to feel a sense of unease due to the sudden braking. As a result, the driver may release the brake pedal 1 improperly, and thus, the vehicle may not stop at the desired point. For this reason, it is advantageous to set the upper limit value A for a certain period of time after the automatic brake control is switched to the brake assist control so that the W/C pressure is restricted by the upper limit, and rapid deceleration resulting from rapid increase in the W/C pressure is prevented. If control is performed in this manner, the driver is less likely to feel a sense of unease. The correlation between the elapsed time T (s) from the beginning of the control and the upper limit value A (Mpa) can be determined, for example, experimentally.

Figure 8:
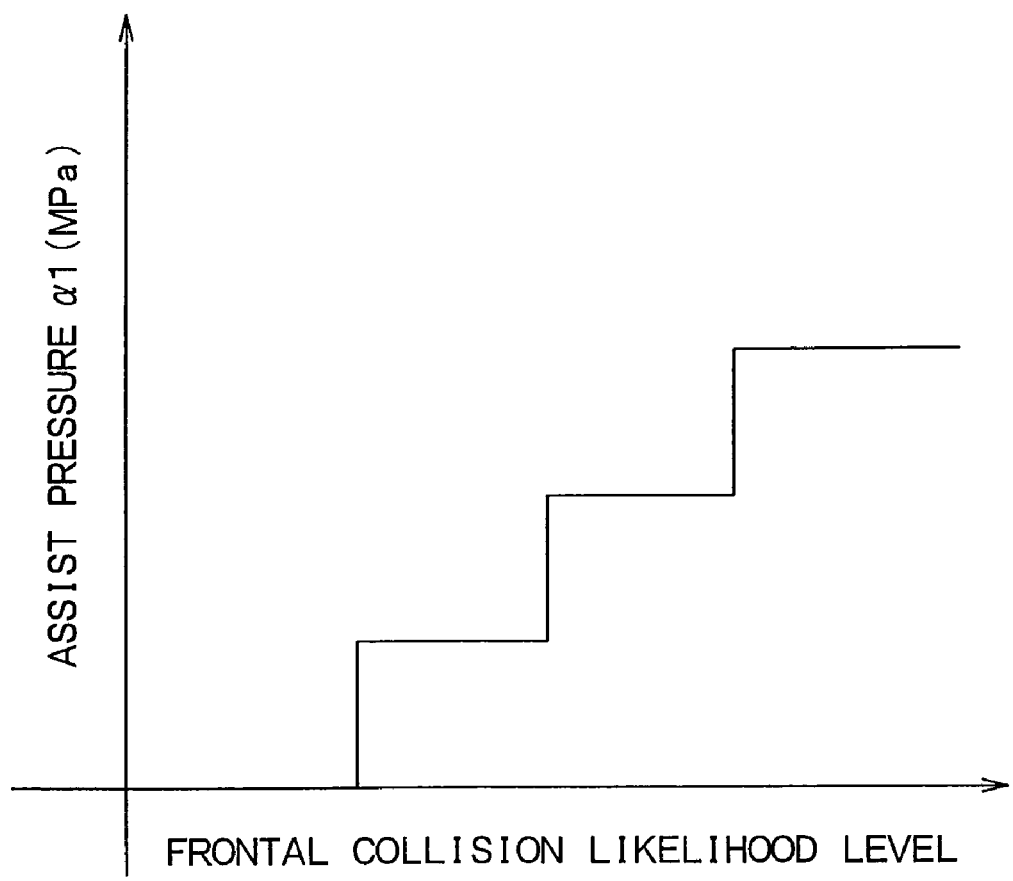
FIG. 8 is a graph showing a correlation between a collision likelihood level and an assist pressure $\alpha 1$.

Next, at 380, a processing for calculating a second value PT2 as a provisional control target W/C pressure for the brake assist control is performed. The processing is performed, for example, based on the relationship between the frontal collision likelihood level and the assist pressure α1 shown in FIG. 8. The term frontal collision likelihood level as used here indicates the level determined at 310. As the frontal collision likelihood level increases, the assist pressure α1 increases in a stepwise manner. The second value PT2 is calculated by adding the assist value α1 to the M/C pressure detected by the pressure sensors 60a and 60b (PT2=M/C pressure+α1).

Next, at 390, a processing of calculating a third value PT3 as a final target value for the W/C pressure in the brake assist control is performed. The third value PT3 can be determined by the following equation:

$$PT3=\operatorname{Min}(\operatorname{Max}(PT2,PT1),PT1+A) \quad \text{Equation 2}$$

where, Max (PT2, PT1) indicates that the larger one of the first value PT1 and the second value PT2 is selected. More specifically, since the second value PT2 is set to the provisional control target W/C pressure that accords with the frontal collision likelihood level, basically, the second value PT2 is the target W/C pressure. This value may be less than the first value PT1 set to the lower limit value. In this case, the W/C pressure is, at the least, set to be equal to or greater than the first value PT1.

The selected one of the first and second values PT1 and PT2 is compared with the sum of the first value PT1 and the upper limit value A. The smaller one is selected as a final target value. If the selected one of the first and second values PT1 and PT2 is larger than the sum of the first value PT1 and the upper limit value A, the driver may be caused to feel a sense of unease due to rapid deceleration. Thus, in order to prevent the driver from being caused to feel unease, the upper limit is set to restrict the W/C pressure.

When the third value PT3 corresponding to the target W/C pressure is set in this way, the output values required in the brake assist control are calculated based on the present estimated W/C pressure and the third value PT3 at 400. Specifically, (a) the required braking force is calculated for each of the wheels FL to RR, and (b) the required time for energizing the solenoids corresponding to the wheels FL to RR, and (c) the required time for driving the motor 80 are determined in order to achieve the braking force for each of the wheels FL to RR.

The brake control of the brake fluid pressure control device 100 according to the embodiment of the present invention is performed is the above described manner. By performing the various processing in the brake control, the following advantages can be obtained.

Firstly, as described above, in the brake fluid pressure control apparatus 100, the first value PT1 is set to the lower limit value of the W/C pressure. The first value PT1 is determined based on the function of the vehicle body deceleration DVb determined in the present calculation cycle. The first value PT1 is set to the lower limit value for restricting the deceleration such that the present level of the vehicle body deceleration DVb is substantially achieved even after the end of the automatic control when the driver depresses the brake pedal 1.

Figure 9:
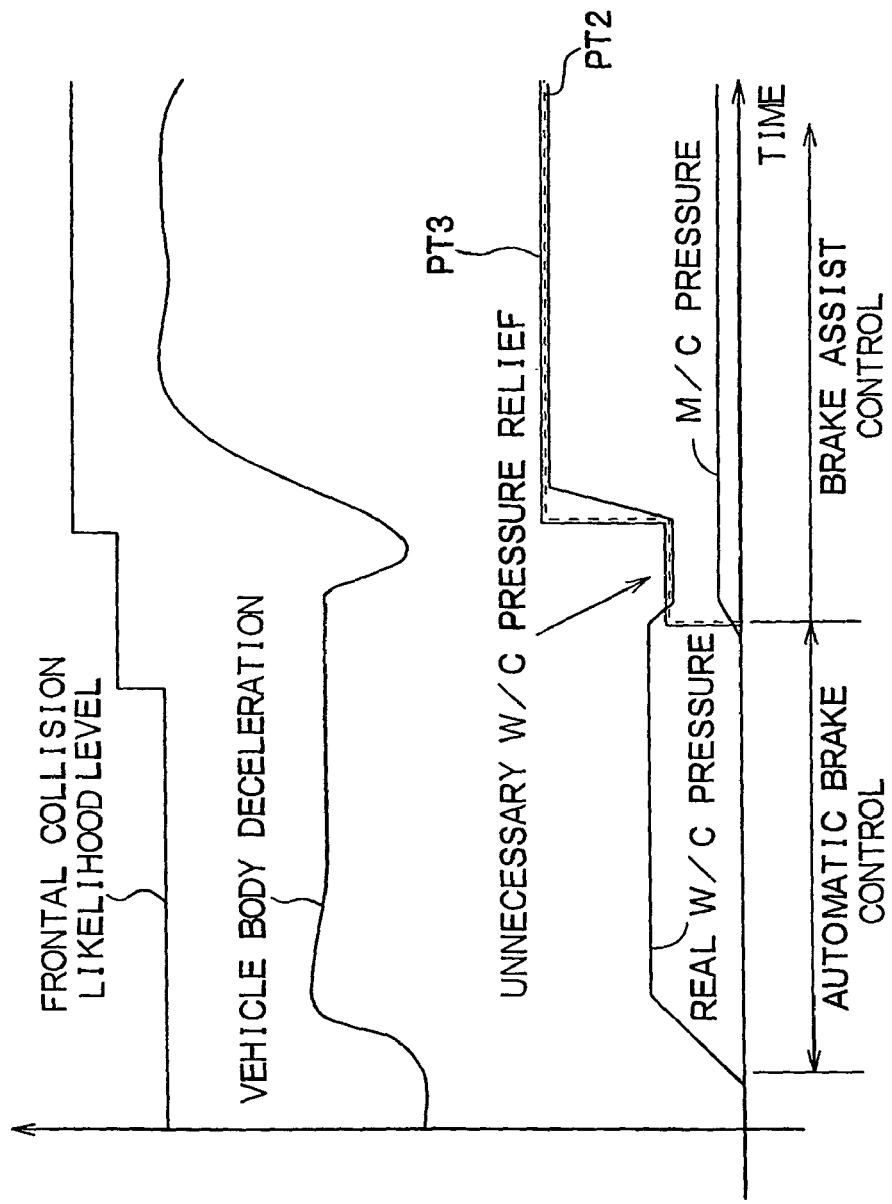
FIG. 9 is a timing chart for a case where a lower limit value of the W/C pressure is not restricted by a first value PT1 when the automatic brake control is switched to the brake assist control.
Figure 10:
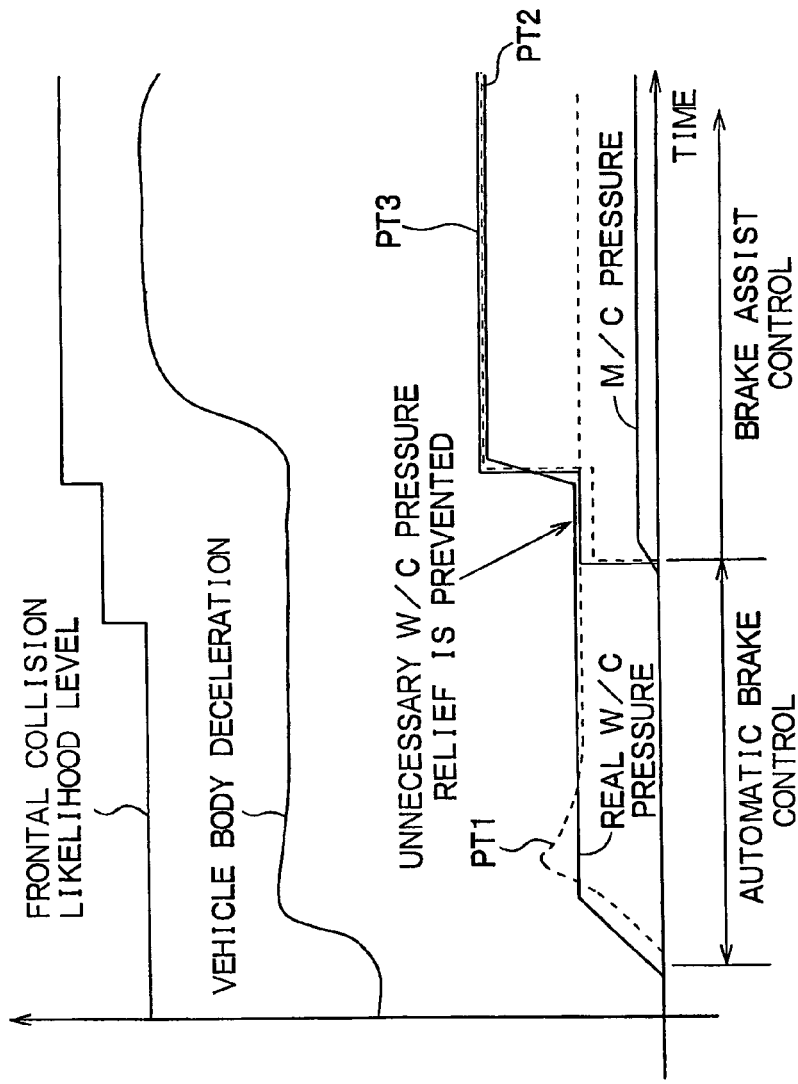
FIG. 10 is a timing chart for a case where the lower limit value of the W/C pressure is restricted by the first value PT1 when the automatic brake control is switched to the brake assist control.

FIGS. 9 and 10 are timing charts for when the automatic brake control is switched to the brake assist control. The timing chart in FIG. 9 is for a case where the lower limit value of the W/C pressure is not restricted by the first value PT1. On the other hand, the timing chart in FIG. 10 is for a case where the lower limit value of the W/C pressure is restricted by the first value PT1.

For example, when the frontal collision likelihood level increases during operation of the automatic brake, and the driver depresses the brake pedal 1, the automatic brake is stopped, and the normal brake control or the brake assist control is started. Thus, brake fluid pressure is applied to each of the wheel cylinders 4, 5, 34 and 35 based on the M/C pressure generated by the driver's operation of the brake pedal 1.

At this time, in the case of FIG. 9 when the lower limit value of the W/C pressure is not restricted, if the W/C pressure generated by the driver's operation of the brake pedal 1 is small in comparison with the W/C pressure generated by the automatic brake control, the deceleration speed is decreased even if the driver actually depresses the brake pedal 1.

In contrast, according to the embodiment of the present invention, the first value PT1 as the lower limit value of the W/C pressure is set. Therefore, as shown in FIG. 10, the actually generated W/C pressure is not smaller than the first value PT1. Thus, it is possible to prevent the W/C pressure from being relieved unintentionally when the automatic brake control is switched to the brake assist control, and thus, it is possible to maintain the deceleration speed at the level of the vehicle body deceleration DVb generated during the automatic brake control. Accordingly, it is less likely that the driver will be caused to feel a sense of unease by weakening of the braking force. Thus, the brake control can be performed such that a brake feeling is generated that accords with a driver's expectations.

In the brake fluid pressure control device 100 according to the embodiment of the present invention, the upper limit of the W/C pressure is set to a value calculated by adding the upper limit value A to the first value PT1. The value calculated by adding the upper limit value A to the first value PT1 determines the upper limit of the change in the deceleration speed in accordance with the elapsed time from when the brake assist control was started. This upper limit suppresses rapid increase in the vehicle body deceleration DVb when the brake assist control is switched to after the automatic brake control is finished due to the driver depressing the brake pedal 1.

Figure 11:
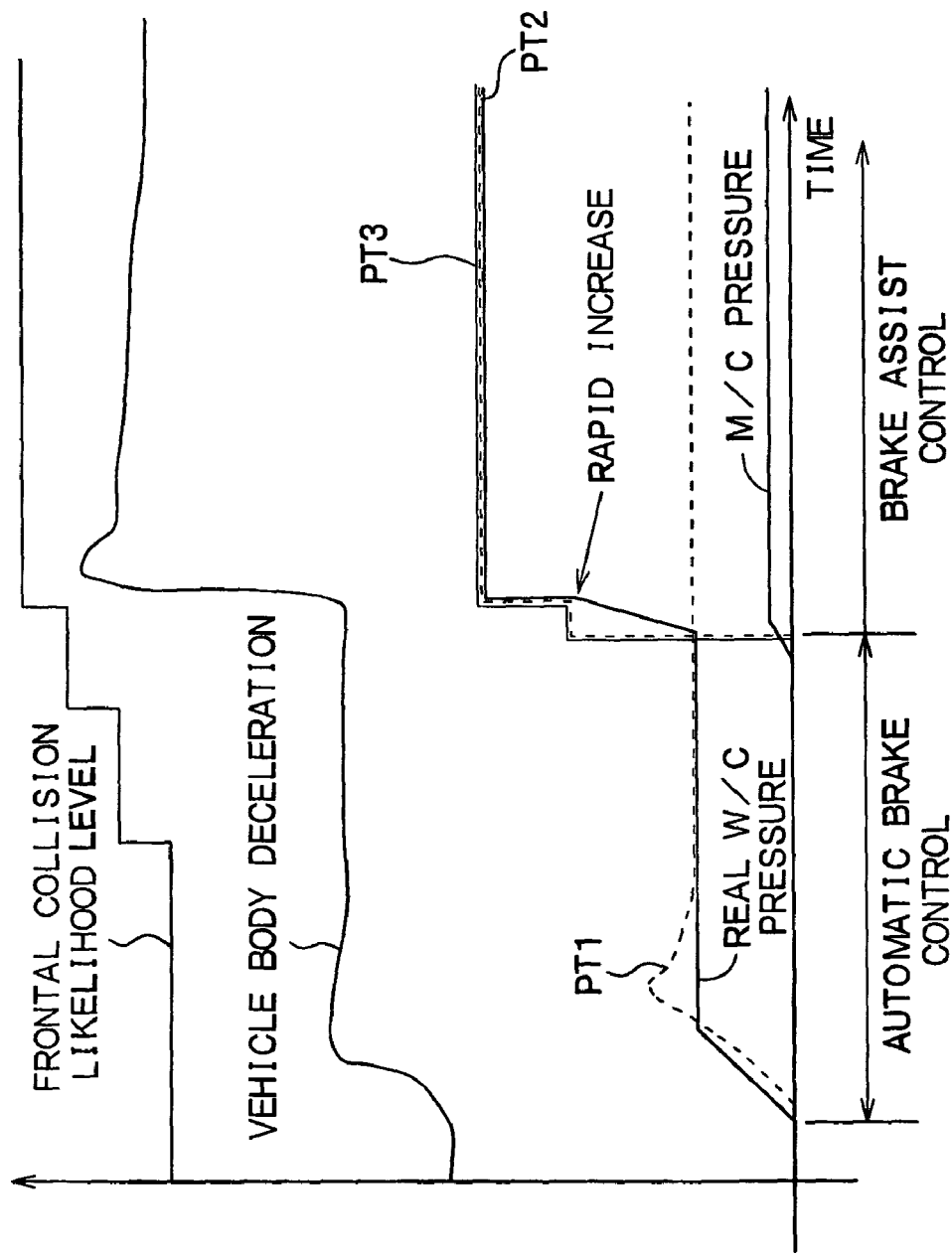
FIG. 11 is a timing chart for a case where no upper limit value is set for the W/C pressure when the automatic brake control is switched to the brake assist control.
Figure 12:
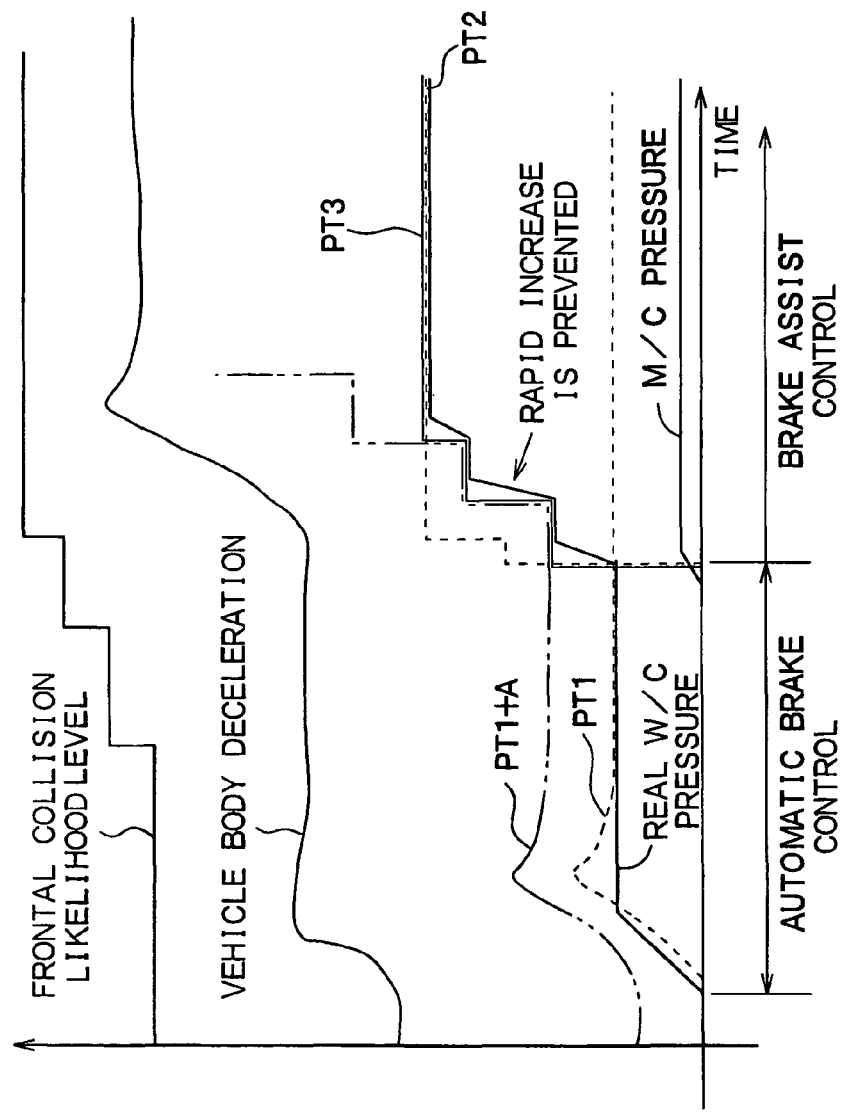
FIG. 12 is a timing chart for a case where the upper limit value of the W/C pressure is set when the automatic brake control is switched to the brake assist control.

FIGS. 11 and 12 are timing charts that illustrate a switch to the brake assist control from the automatic brake control. FIG. 11 shows, for reference purposes, a case where no upper limit value is set for the W/C pressure, and FIG. 12 shows a case where the upper limit value of the W/C pressure is set in the same way as the embodiment of the present invention.

For example, if the frontal collision likelihood level increases during operation of the automatic brake, and the driver depresses the brake pedal 1 strongly, the automatic brake is stopped, and the automatic brake control is switched to the brake assist control. Thus, brake fluid pressure is applied to each of the wheel cylinders 4, 5, 34 and 35 based on the M/C pressure generated by the driver's operation of the brake pedal 1.

At this time, as shown in FIG. 11, if the W/C pressure generated by the driver's operation of the brake pedal 1 increases rapidly in comparison with the W/C pressure generated by the automatic brake, rapid increase in the deceleration speed occurs. Thus, the driver may be caused to feel unease due to sudden braking. Accordingly, the driver may release the brake pedal 1, and the vehicle may not stop at the desired position.

In contrast, according to the embodiment of the present invention, the upper limit of the W/C pressure is set to a value calculated by adding the upper limit value A to the first value PT1. Thus, as shown in FIG. 12, the actually generated W/C pressure does not increase rapidly, but increases in a stepwise manner. Therefore, it is possible to prevent rapid increase of the W/C pressure from occurring when the automatic brake control is switched to the brake assist control, and thus, it is possible to prevent the rapid increase of the vehicle body deceleration DVb. Accordingly, it is less likely that the driver will feel a sense of unease due to sudden application of braking force. Thus, the brake control can be performed such that a brake feeling is generated that accords with a driver's expectations.

Other Embodiments

In the above-described embodiment, at 530, the first value PT1 as the lower limit value is determined based on the function of the vehicle body deceleration DVb using the map in FIG. 6. However, this is merely one possible example. The first value PT1 may be determined, for example, based on respective histories of how the control valves and the motor have been driven during the automatic brake control, which are parameters that can be used for estimating the present vehicle body deceleration DVb. Alternatively, the present W/C pressure may be detected directly, and the detected value may be used as the first value PT1.

Further, in the above-described embodiment, as an example of the brake control device according to the present invention, the brake fluid pressure control device controls the brake system using the hydraulic pressure that applies the brake fluid pressure to the wheel cylinders. However, it is not essential to use a hydraulic pressure brake system to realize the present invention.

For example, the present invention may be applied to a brake system including an electric brake in which a motor is used to push a brake pad against a disk rotor to generate frictional force. In such a brake system using an electric brake, structural members provided for a caliper of the electric brake and the disk rotor correspond to the braking force generating unit. Further, the motor is energized to move the brake pad, and the distance of the movement is controlled so as to control the pressure applied to the disk rotor.

While the above description is of the preferred embodiments of the present invention, it should be appreciated that the invention may be modified, altered, or varied without deviating from the scope and fair meaning of the following claims.

What is claimed is:

1. A vehicular brake control device for use in a vehicle equipped with a front condition detection sensor for detecting a frontal collision likelihood level indicating a likelihood that a collision with an obstacle in front of the vehicle will occur, a master cylinder pressure detection unit for detecting a brake fluid pressure of a master cylinder and a braking force generating unit, the brake control device performing a manual brake control including a brake assist control and an automatic brake control, wherein:

the brake control device, in the automatic brake control, automatically applies braking force to the braking force generating unit entirely independently of an operation of a brake control member that is operated by a driver, the brake control device, in the manual brake control, applies braking force to the braking force generating unit in accordance with the operation of the brake control member by the driver, the brake control device, in the brake assist control, determines a target value of an application pressure and applies the target value to the braking force generating unit, the target value of the application pressure is set based on an assisting application pressure, the brake fluid pressure of the master cylinder detected by the master cylinder pressure detection unit and an upper limit of the target value, the assisting application pressure is set based on the detected frontal collision likelihood level, a provisional value, which is for determining the target value, is calculated by adding the brake fluid pressure of the master cylinder and the assisting application pressure, the upper limit of the target value is set to increase in accordance with an increase of an elapsed time from a start of the brake assist control, and a smaller one of the provisional value and the upper limit is set as the target value.

2. The vehicular brake control device according to claim 1, wherein the upper limit is calculated by adding a first value to an upper limit value of change in the application pressure of the braking force generating unit, wherein the upper limit value of change in the application pressure is determined based on an elapsed time from a start of the manual brake control, and the first value is set to a lower limit value of the target value based on the application pressure generated by the braking force generating unit during the automatic brake control.

* * * * *

UNITED STATES PATENT AND TRADEMARK OFFICE
CERTIFICATE OF CORRECTION

PATENT NO. : 8,038,227 B2
APPLICATION NO. : 12/007926
DATED : October 18, 2011
INVENTOR(S) : Ken Kudo Page 1 of 1

It is certified that error appears in the above-identified patent and that said Letters Patent is hereby corrected as shown below:

Title Page:

Correct Item (75) Inventors

Change "Keni Kudo" to
  --Ken Kudo--.

Signed and Sealed this
Twenty-seventh Day of December, 2011

David J. Kappos
*Director of the United States Patent and Trademark Office*